US012358583B2

(12) United States Patent
Kornas

(10) Patent No.: US 12,358,583 B2
(45) Date of Patent: Jul. 15, 2025

(54) PORTABLE BICYCLE RACK

(71) Applicant: Darren Kornas, Palmetto, GA (US)

(72) Inventor: Darren Kornas, Palmetto, GA (US)

(*) Notice: Subject to any disclaimer, the term of this patent is extended or adjusted under 35 U.S.C. 154(b) by 0 days.

(21) Appl. No.: 18/199,618

(22) Filed: May 19, 2023

(65) Prior Publication Data
US 2023/0373580 A1 Nov. 23, 2023

Related U.S. Application Data

(60) Provisional application No. 63/344,334, filed on May 20, 2022, provisional application No. 63/344,280, filed on May 20, 2022.

(51) Int. Cl.
*B62H 3/06* (2006.01)
(52) U.S. Cl.
CPC .................... *B62H 3/06* (2013.01)
(58) Field of Classification Search
CPC ... B62H 3/00; B62H 3/04; B62H 3/06; B62H 3/08; B62H 3/10
USPC .................................. 211/17–24
See application file for complete search history.

(56) References Cited

U.S. PATENT DOCUMENTS

| | | | | |
|---|---|---|---|---|
| 557,470 A | * | 3/1896 | Young | B62H 3/08 211/20 |
| 574,689 A | * | 1/1897 | Stover et al. | B62H 3/08 211/20 |
| 585,739 A | * | 7/1897 | Brundage | B62H 3/08 211/20 |
| 590,443 A | * | 9/1897 | Temple | B62H 3/04 211/21 |
| 620,863 A | * | 3/1899 | Wilcox | B62H 3/04 211/21 |
| 3,785,500 A | * | 1/1974 | Kennelly | B62H 3/04 D12/115 |
| 4,033,459 A | * | 7/1977 | Zach | B62H 3/10 211/20 |

(Continued)

FOREIGN PATENT DOCUMENTS

| JP | 11-020758 A | 1/1999 |
|---|---|---|
| JP | 2005-134777 A | 5/2005 |

OTHER PUBLICATIONS

Internatioanl Search Report and Written Opinion from International Application No. PCT/US2023/022878 dated Dec. 13, 2023.

*Primary Examiner* — Patrick D Hawn
(74) *Attorney, Agent, or Firm* — MARSHALL, GERSTEIN & BORUN LLP

(57) ABSTRACT

A folding bicycle rack is provided including a base having first and second legs. The folding bicycle rack includes a support panel having slots to receive a portion of a bicycle wheel. The support panel includes first and second lower portions shiftably coupled to the first and second legs, respectively. The folding bicycle rack including a brace pivotally coupled to both the base and a first side of the support panel. The support panel is shiftable between a stowed position by moving the first and second lower portions of the panel to a first position relative to the first and second legs, and an upright position by moving the first and second lower portions to a second position relative to the first and second legs. The folding bicycle rack includes a retention assembly for securing the support panel in the upright position.

14 Claims, 17 Drawing Sheets

(56) References Cited

U.S. PATENT DOCUMENTS

| | | | | |
|---|---|---|---|---|
| 5,516,020 | A | * | 5/1996 | Lawler ...................... B60R 9/00 |
| | | | | 224/570 |
| 6,948,621 | B1 | * | 9/2005 | Lassanske ................ B62H 3/06 |
| | | | | 211/21 |
| 8,360,252 | B1 | * | 1/2013 | Fagan ...................... B62H 3/10 |
| | | | | 211/21 |
| 11,352,083 | B1 | * | 6/2022 | Gu ........................... B62H 3/04 |
| D986,624 | S | * | 5/2023 | Jia ............................... D6/675.3 |
| 2012/0181121 | A1 | | 7/2012 | Bailey et al. |
| 2013/0270201 | A1 | | 10/2013 | Vineyard |
| 2018/0215428 | A1 | | 8/2018 | Laight |

* cited by examiner

PORTABLE BICYCLE RACK

CROSS REFERENCE TO RELATED APPLICATIONS

This application claims the benefit of the filing date of U.S. Provisional Patent Application No. 63/344,280, filed May 20, 2022 and U.S. Provisional Patent Application No. 63/344,334, filed May 20, 2022. The contents of U.S. Provisional Patent Application Nos. 63/344,280 and 63/344,334 are hereby incorporated by reference in their entirety.

FIELD

The present disclosure relates to bicycle storage racks and, more particularly, to portable bicycle racks.

BACKGROUND

Portable bicycle racks are often quite bulky and require elaborate assembly. In some examples, the portable bicycle racks require various fasteners and tools for assembly. As a result, transporting and assembling various portable bicycle racks are too burdensome for frequent or semi-frequent use.

Portable bicycle racks need to be large enough to securely store several bicycles, but small enough to be portable and moved. Accordingly, the portable bicycle rack must be sufficiently rugged to uphold the bicycle. Additionally, the portable bicycle rack would be configurable between a deployed position and a transport position. As a result, the portable bicycle rack would be easier to convey between two locations.

SUMMARY

In a first embodiment, the folding bicycle rack generally includes a base, a support panel, and a brace pivotally coupled to the support. The support panel is shiftable between a stowed position and an upright position. The support panel includes several slots that, when the support panel is in the upright position, is configured to receive a bicycle wheel. In some examples, the brace is pivotally coupled to both the support panel and the base. To transition the support panel between the upright position and the stowed position, the support panel may be shiftably coupled to the base at lower portions of the support panels. In the stowed position, the support panel envelopes the base.

In a second embodiment, the folding bicycle rack generally includes a base, a support panel, and a brace pivotally coupled to the support. The support panel is shiftable between a stowed position and an upright position. The support panel includes several slots that, when the support panel is in the upright position, is configured to receive a bicycle wheel. In some examples, the brace is pivotally coupled to both upper portions of the support panel and the base. To transition the support panel between the upright position and the stowed position, the support panel may be shiftably coupled to the base at lower portions of the support panels. Further, in the stowed position, the support panel is disposed within the base.

In a third embodiment, the folding bicycle rack is substantially similar to the folding bicycle rack of the second embodiment. But, instead the support panel comprises a top and bottom rod and a plurality of partitions. The partitions are configured to form a plurality of slots. The slots configured to receive a bicycle wheel to secure a bicycle to the folding bicycle rack.

In a fourth embodiment, the portable bicycle rack is configured to simply disassemble into a storage position and assemble into a storage or upright position. The portable bicycle rack includes a support panel, a first and second leg, and a first and second cross brace. The first and second leg are coupled to the support panel by, for example, matching lap joints. Additionally, the cross braces may be coupled to the first and second legs, for example, also by matching lap joints. In some examples, each of the support panel, first and second legs, and first and second cross braces may include magnets to secure the components together in the storage and/or upright position.

Disclosed herein is a folding bicycle rack, including a base having a first leg and a second leg spaced apart from the first leg. The bicycle rack also includes a support panel having an upper portion, a lower portion, and a central portion extending between the upper portion and the lower portion. The support panel includes a plurality of slots sized and positioned to receive a portion of a bicycle wheel. The support panel also includes first and second lower portions, the first lower portion shiftably coupled to the first leg via a first pin and the second lower portion shiftably coupled to the second leg via a second pin. The support panel includes a first side and a second side. The folding bicycle rack may also include a brace pivotally coupled to both the base and the first side of the support panel. The support panel is shiftable between a stowed position by moving the first and second lower portions of the support panel to a first position relative to the first and second legs, and an upright position by moving the first and second lower portions to a second position relative to the first and second legs. As a result, the folding bicycle rack includes a stowed position in which the first and second lower portions of the support panel are disposed adjacent to a first position relative to the first and second legs, and an upright position in which the first and second lower portions are disposed adjacent to a second position relative to the first and second legs. The folding bicycle rack also includes a retention assembly for securing the support panel in the upright position.

In some variations, the retention assembly includes a magnet disposed on the base configured to releasably retain at least one of the first pin and the second pin when the support panel is in the stowed position. Additionally, at least one of the first pin and the second pin may include a bushing. Additionally, each of the first leg and the second leg includes a channel disposed on or in the first leg and the second leg. Also, the first pin is shiftably disposed in the channel of the first leg and the second pin is shiftably disposed in the channel of the second leg.

In other variations, the retention assembly comprises a first depressed trough in the channel of the first leg and a second depressed trough in the channel of the second leg, wherein the first pin and the second pin are releasably secured in the first and second depressed troughs when the support panel is in the upright position.

Also disclosed herein is a folding bicycle rack having a base with a first leg and a second leg spaced apart from the first leg. Additionally, the bicycle rack may include a support panel having an upper portion, a lower portion, and a central portion extending between the upper portion and the lower portion. The support panel may include a plurality of slots sized and positioned to receive a portion of a bicycle wheel. The support panel may also include first and second lower portions, the first lower portion shiftably coupled to the first leg and the second lower portion shiftably coupled to the second leg. The bicycle support rack may also include a brace pivotally coupled to the support panel such that the support panel is shiftable between a stowed position by moving the first and second lower portions of the support panel to a first position relative to the first and second legs, and an upright position by moving the first and second lower portions to a second position relative to the first and second legs. As a result, the folding bicycle rack includes a stowed position in which the first and second lower portions of the support panel are disposed adjacent to a first position relative to the first and second legs, and an upright position in which the first and second lower portions are disposed adjacent to a second position relative to the first and second legs. Further, the bicycle support rack also includes a retention assembly for securing the support panel in the upright position.

In other variations, a first extension is coupled to the first leg and configured to extend away from the second leg and a second extension is coupled to the second leg and configured to extend away from the first leg. The base may also include at least one cross member extending between the first leg and the second leg.

In yet other variations, the support panel includes a first side and a second side. The brace may be a first brace and further include a second brace, wherein the first brace is pivotally coupled to the first side of the support panel and the second brace is pivotally coupled to the second side of the support panel. Additionally, the first brace may be pivotally coupled to a portion of the first leg and the second brace may be pivotally coupled to a portion of the second leg.

In further variations, the support panel is shiftably coupled to at least one of the first leg and the second leg via a pin. The pin may include a bushing. In some examples, the retention assembly has a mechanical latch disposed on the base configured to releasably secure the pin when the support panel is in the upright position.

In some variations, the support panel includes a first and second upper portions, wherein the first and second upper portions are disposed adjacent to the first and second legs, respectively, in the stowed position. Additionally, in the upright position, the first and second upper portions are disposed away from the second position relative to the first and second legs.

Also disclosed herein is a folding bicycle rack including a support panel having an upper portion, a lower portion, and a central portion extending between the upper portion and the lower portion. The support panel includes a plurality of slots sized and positioned to receive a portion of a bicycle wheel. The support panel also includes a first side and a second side and a first brace and a second brace. The first brace is pivotally coupled to the first side of the support panel and the second brace is pivotally coupled to the second side of the support panel. Additionally, the support panel is shiftable between a stowed position by moving the first brace and the second brace to a retracted position, and an upright position by moving the first brace and the second brace to a deployed position. As a result, the folding bicycle rack includes a stowed position in which the first brace and the second brace are in a retracted position, and an upright position in which the first brace and the second brace are in a deployed position. The folding bicycle rack also includes a retention assembly for securing the support panel in the upright position.

In some variations, the folding bicycle rack includes a base having a first leg and a second leg spaced apart from the first leg and the support panel is shiftably coupled to the base. In such examples, the first brace may be pivotally coupled to the first leg and the second brace may be pivotally coupled to the second leg.

In other variations, the retention assembly comprises a releasable mechanical latch. In various examples, the retention assembly can be disposed on the base to secure a pin in the channel, disposed on the base or the support panel to engage the support panel in the upright position or the stored position, or disposed on the base, support panel, or braces to secure the brace in the deployed position or the retracted position. For example, the releasable mechanical latch may be biased to an open or closed position and may be spring loaded (e.g., spring loaded pin or cotter pin arrangement). Additionally, in some examples, the retention assembly is gravity biased to secure a support panel in the upright position and/or the stowed position (e.g., a gravity biased latch). In some examples, the retention assembly includes a lock with an actuating bolt to secure the support panel in the upright and/or the stowed position. In other examples, the retention assembly could be based on various door handle latching mechanisms (spring loaded latch with angled end) and deadbolt mechanisms. Additionally, the brace may include a turn-to-lock or twist latch mechanism to secure the brace in the deployed position or the retracted position. Based on the foregoing, various mechanical structures to selectively secure a foldable bicycle rack in an upright or deployed position and/or a stowed or transport position are disclosed herein.

BRIEF DESCRIPTION OF THE DRAWINGS

The present disclosure is described in the following detailed description in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

The present disclosure is generally directed to a folding (or portable) bicycle rack. The folding bicycle rack includes a transport or stowed position and a deployed or upright position. In the upright position, the folding bicycle rack can secure and store one or more bicycles (e.g., two, four, seven bicycles). To secure bicycles to the folding bicycle rack, the bicycle rack may include a support panel including a plurality of slots. Each of the slots is configured to receive a bicycle wheel.

Figure 1:
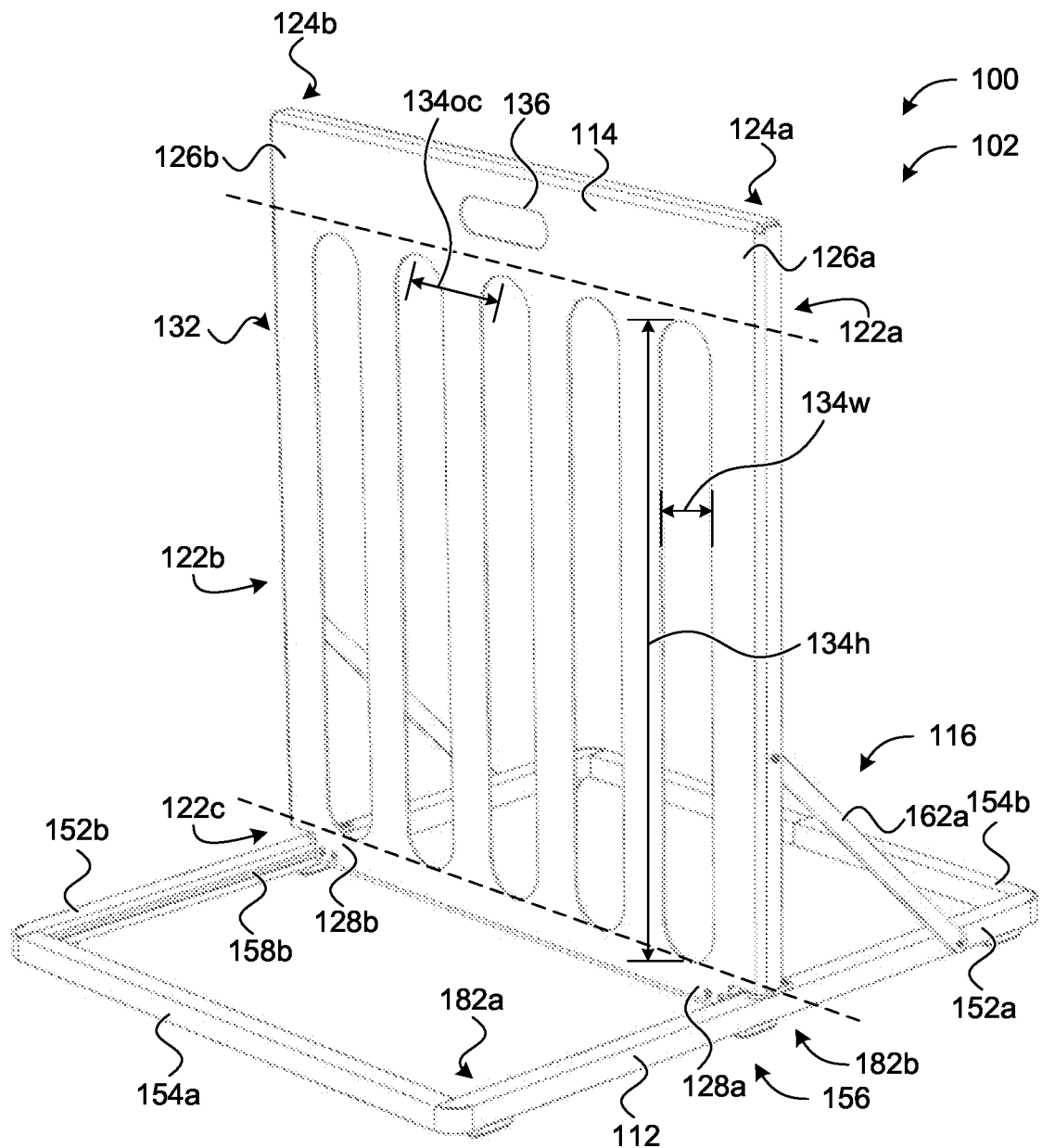
FIG. 1 is a perspective front view of a folding bicycle rack in an upright or deployed position in accordance with the present disclosure.

Referring now to the figures, FIG. 1 illustrates a folding bicycle rack 100 in an upright position 102 in accordance with the present disclosure. The folding bicycle rack 100 includes a base 112, a support panel 114, and braces 116. As shown in FIG. 1, the folding bicycle rack 100 is configured to store up to five bicycles (e.g., two on one side of the support panel 114 and three on the other side of the support panel 114). As shown in FIG. 1, the support panel 114 in the upright position 102 is perpendicular to the base 112, but in various examples, the upright position 102 may be disposed at any other angle sufficient to receive and support a bicycle tire (e.g., 30 degrees)(°, 45°, 60°, 80°).

The support panel 114 includes an upper portion 122*a*, a central portion 122*b*, and a lower portion 122*c*. The central portion 122*b* extends between the upper portion 122*a* and the lower portion 122*c*. Additionally, the support panel 114 including a first side 124*a* and a second side 124*b*. The support panel 114 includes a first upper corner 126*a* in the upper portion 122*a* of the first side 124*a*. The support panel 114 also includes a second upper corner 126*b* in the upper portion 122*a* of the second side 124*b*. Further, the support panel 114 includes a first lower corner 128*a* in the lower portion 122*c* of the first side 124*a* and a second lower corner 128*b* in the lower portion 122*c* of the second side 124*b*.

The support panel 114 includes a plurality of slots 132 sized and positioned to receive a portion of a bicycle wheel. In the example of FIG. 1, the support panel 114 includes five slots 132. In the example of FIG. 6, the support panel 614 may have three slots 632, but the bicycle support panel may have more or fewer slots (e.g., 1, 2, 6, 9, etc.). Each of the slots 132 may define a height 134*h* and a width 134*w* and may be spaced apart a distance 134*oc* on center. In various examples, the height 134*h* may be approximately 26 inches (in.), but may be between 20 in. and 35 in. The width 134*w* may be approximately 3 in., but may be between 1 in. and 6 in. Additionally, in some examples, the distance 134*oc* may be approximately 10 in, but may be between 5 in. and 20 in. Each of the slots 132 is configured to receive a bicycle tire and the slots are spaced apart to secure a bicycle in every other slot 132 on the same side of the support panel 114. In various examples, the bottom of the slot may be disposed approximately 2.25 inches from the ground, but could be 1 in. to 4 in. above the ground. In various examples, any of these dimensions could be adjusted based on different variations in bicycle and bicycle tire design.

Figure 5:
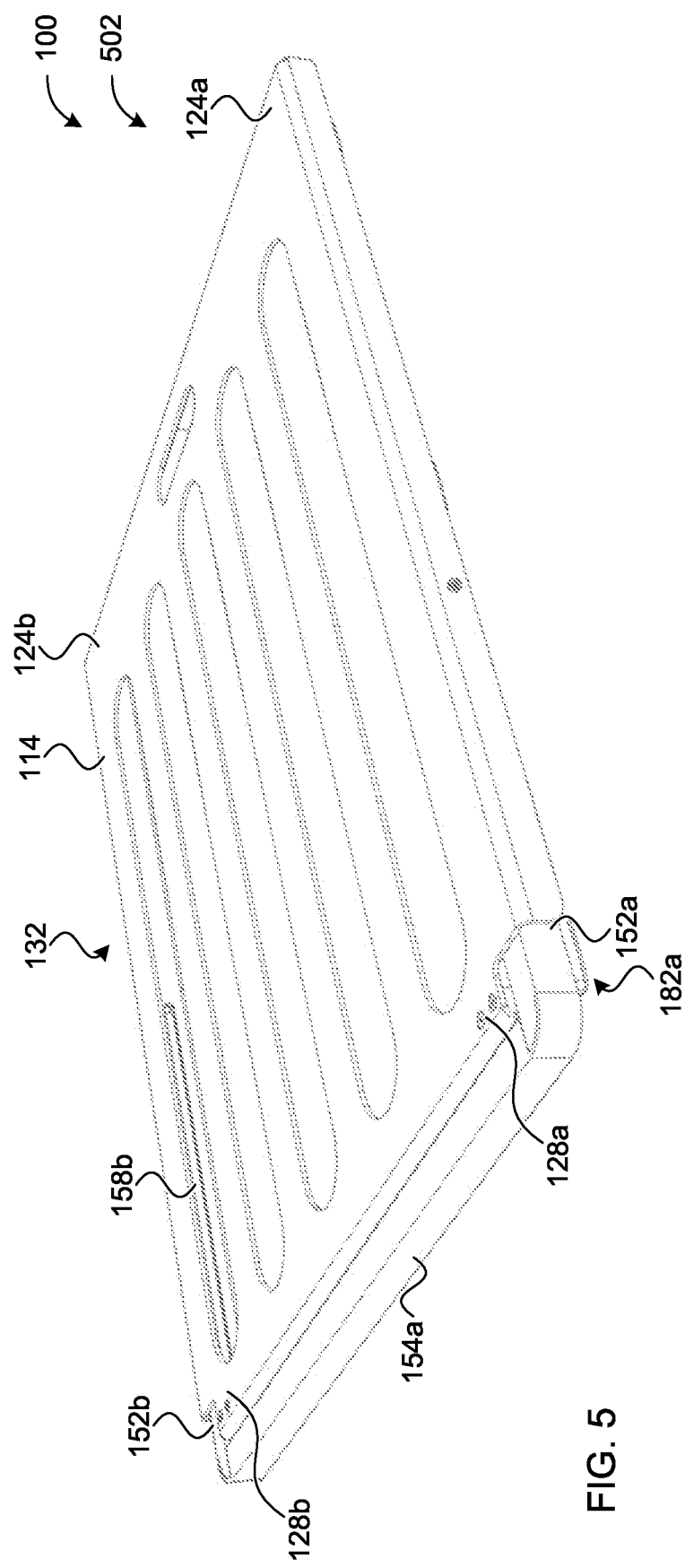
FIG. 5 is a perspective view of the folding bicycle rack of FIGS. 1, 2, 3, and 4.

In the illustrated examples, the support panel 114 is shown in the upright position 102. As shown, the support panel 114 is a unitary or monolithic piece and the slots 132 are disposed in the support panel 114. In various examples, the slots 132 may be cut out of the support panel 114 or may be molded into the support panel. In other examples, the support panel 114 and the slots 132 may be joined together from multiple pieces via welding or other fastening techniques. In some examples, each of the slots 132 include a grommet (not shown) lining a perimeter of the slots 132. Additionally, the edges of the support panel 114 may be bent and configured to enclose the base 112, as shown in FIG. 5. In various examples, the support panel 114 may include other features, such as a handle 136 for added convenience in handling the folding bicycle support rack 100.

The base 112 includes a first leg 152*a*, a second leg 152*b*, a first cross brace member 154*a*, and a second cross brace member 154*b*. The first leg 152*a* is spaced apart from, and disposed opposite, the second leg 152*b*. The base 112 further includes a plurality of feet 156 (shown in greater detail in FIG. 4). In some examples, the base 112 is made of metal (e.g., aluminum, steel, etc.) or other natural (e.g., wood, etc.) or synthetic (e.g., carbon fiber, plastic, etc.) and rigid material while the feet 156 are made of rubber or similar material, either natural or synthetic.

In the present example, the support panel 114 is shiftably coupled to the base 112. The first lower corner 128*a* is shiftably coupled to the first leg 152*a* via a first pin (shown in FIG. 3) and the second lower corner 128*b* is shiftably coupled to the second leg 152*b* via a second pin (shown in FIG. 3). The first pin is disposed in a first guide channel 158*a* (shown in FIGS. 2 & 3) and the second pin is disposed in a second guide channel 158*b*. In the present example, the first channel 158*a* and the second channel 158*b* are disposed in the first leg 152*a* and the second leg 152*b*, respectively. For example, the first and second channels 158*a*, 158*b* may be computer numerical control (CNC) cut into the first and second legs 152*a*, 152*b*, respectively or could be extruded.

The braces 116 are pivotally coupled to both the base 112 and the support panel 114. The braces 116, shown in FIG. 1, are in a deployed position and supporting the support panel 114 in the upright position 102. In the present examples, the braces 116 include a first brace 162*a* and a second brace 162*b*. The first brace 162*a* is pivotally coupled to the first side 124*a* of the support panel 114 and the first leg 152*a* and the second brace 162*b* is pivotally coupled to the second side 124*b* of the support panel 114. In some examples, the first brace 162*a* and the second brace 162*b* are only pivotally coupled to the first and second sides 124*a*, 124*b* of the support panel, respectively. In the example of FIG. 1, the first and second brace 162*a*, 162*b* are pivotally coupled to the central portion 122*b*, but in other examples, the first and second braces 162a, 162b can be pivotally coupled to the upper portion 122a (as shown in FIG. 7) or the lower portion 122c.

The support panel 114 is shiftable between a stowed position 502 (or a transport position) (shown in FIG. 5) and a deployed position or upright position 102. In the stowed position 502, the first lower corner 128a and the second lower corner 128b are disposed adjacent a first position 182a on the first leg 152a and the second leg 152b. In the present example, a first end of the channels 158a, 158b is disposed at the first position 182a. In the upright position 102 the first lower corner 128a and the second lower corner 128b are disposed adjacent a second position 182b on the first leg 152a and the second leg 152b. The channels 158a, 158b have a second end disposed at the second position 182b. As shown in FIG. 1, the first position 182a is disposed adjacent the first cross brace member 154a and the second position 182b is disposed at approximately the midpoint of the first leg 152a and the second leg 152b. In other examples, the first position 182a and the second position 182b are disposed elsewhere on the first and second legs 152a, 152b.

The folding bicycle rack 100 further includes a retention assembly (shown in greater detail in FIGS. 7A, 7B, and 9) for securing the support panel 114 in the upright position 102. In some examples, the retention assembly is configured to releasably secure the pin at the second position 184. In other examples, the retention assembly selectively prevents the braces 116 from pivoting when the support panel is in the upright position 102. Further, the retention assembly could be configured to selectively engage the first and second lower corners 128a, 128b when the support panel 114 is in the upright position 102. But, the retention assembly is configured to switch between a locked position, configured to secure the support panel 114 in the upright position 102 or the stowed position 502, and an unlocked position to allow the support panel 114 to transition between the upright position 102 and the stowed position 502.

Figure 2:
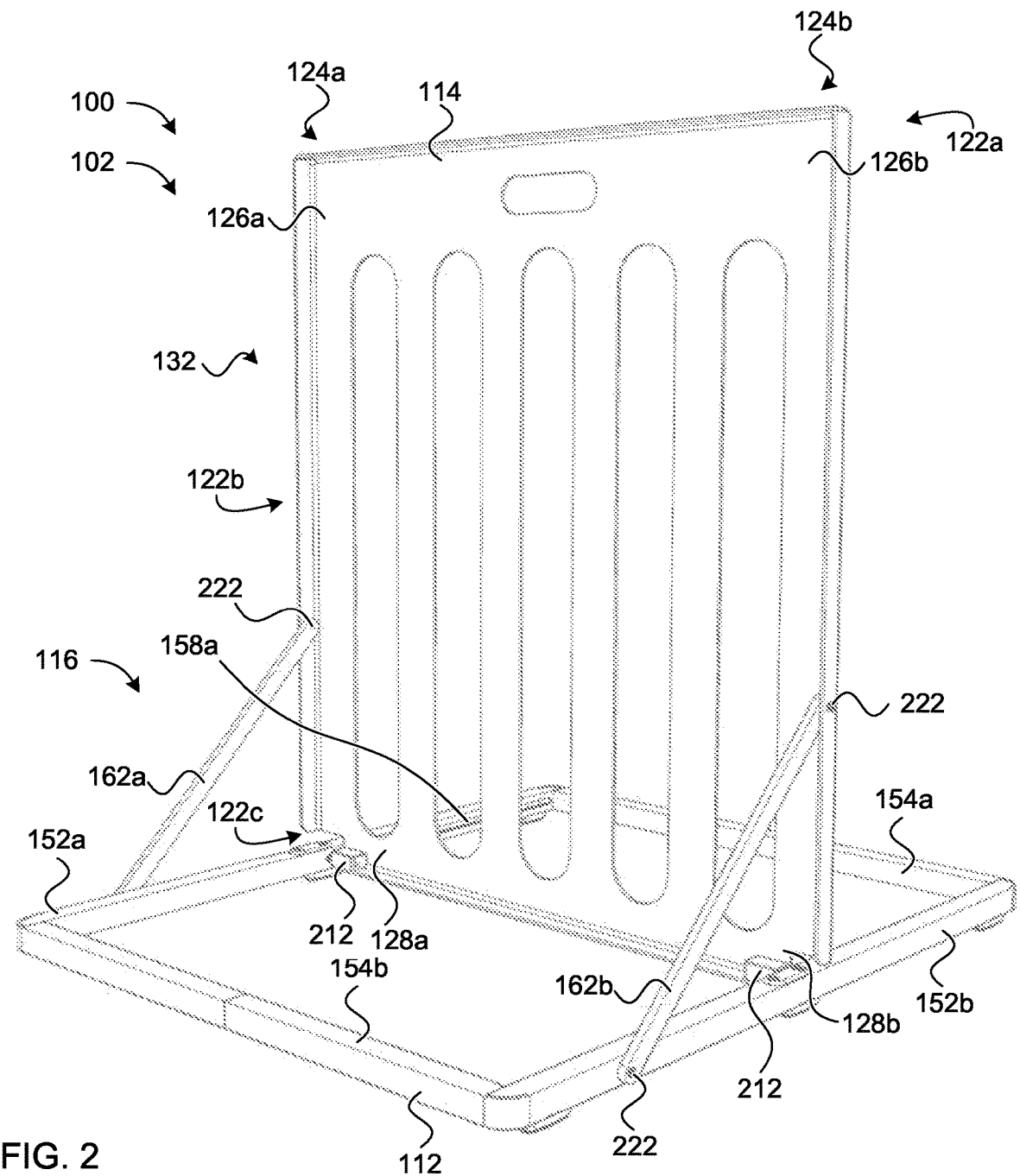
FIG. 2 is a perspective rear view of the folding bicycle rack of FIG. 1.

FIG. 2 is a perspective rear view of the folding bicycle rack 100 of FIG. 1. As shown in FIG. 2 the first channel 158a is disposed opposite the second channel 158b. The channels 158a, 158b are configured to receive a pin. The support panel 114 includes a coupling mechanism 212. The coupling mechanism 212 disposed at the first lower corner 128a includes the pin configured to engage the first channel 158a and the coupling mechanism 212 disposed at the second lower corner 128b includes the pin configured to engage the second channel 158b. In some examples, the pin is rotatable relative to only the first and second channels 158a, 158b or may be rotatable to both the first and second channels 158a, 158b and the coupling mechanisms 212. In the present example, shown in FIGS. 1 and 2, the coupling mechanisms 212 can be fastened to the support panel 114 via fasteners, but the coupling mechanisms 212 could be coupled with adhesives or made integral with the support panel 114.

As shown in FIG. 2, the braces 116 are coupled to the base 112 and the support panel 114 via pivotable couplings 222. The pivotable couplings 222 could be any type of low-friction bushing. Although the braces 116 are shown pivotally coupled to both the base and the support panel 114, in some examples, the braces 116 may be only coupled to the support panel 114. In some examples, the support panel 114 can be disposed in the upright position 102 with only the braces 116 (e.g., without the base 112).

Figure 3:
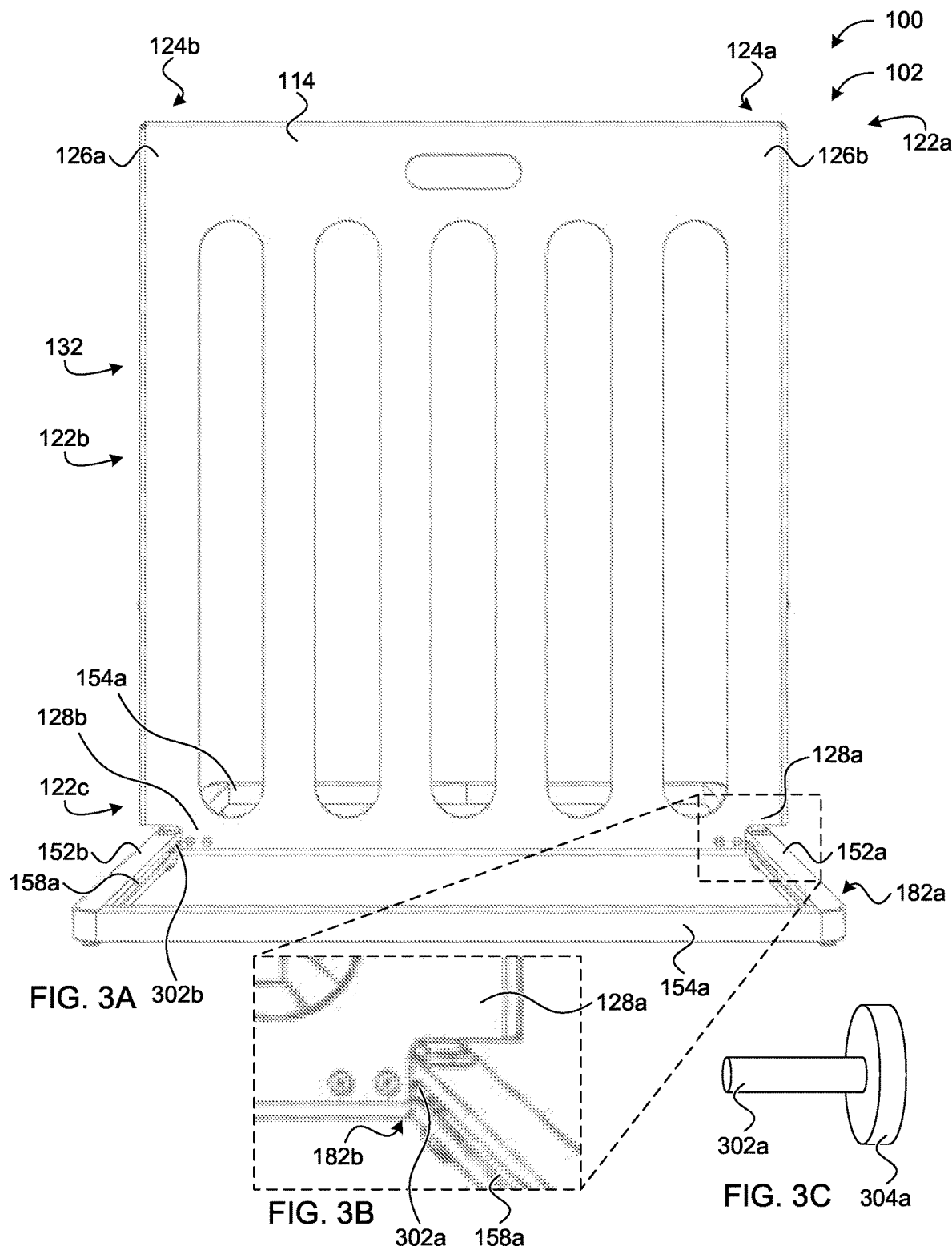
FIG. 3A is a front view of the folding bicycle rack of FIGS. 1 and 2.
FIG. 3B is an enlarged view of a pin of the folding bicycle rack disposed in a guide channel.
FIG. 3C is a perspective view of the pin.

FIG. 3 is a front view of the folding bicycle rack of FIGS. 1 and 2. As shown in FIG. 3, the first pin 302a is disposed in the first channel 158a (shown in greater detail in FIG. 3A) and the second pin 302b is disposed in the second channel 158b. In some examples, the first pin 302a (illustrated by example in FIG. 3B) and the second pin 302b include a bushing (e.g., bushing 304a) or ball bearing to decrease friction as the first and second pins 302a, 302b slide in the first and second channels 158a, 158b respectively. As a result, the first and second lower corners 128a, 128b can easily slide from the second position 182b (corresponding to the upright position 102) to the first position 182a (corresponding to the transport or stowed position 502).

Figure 4:
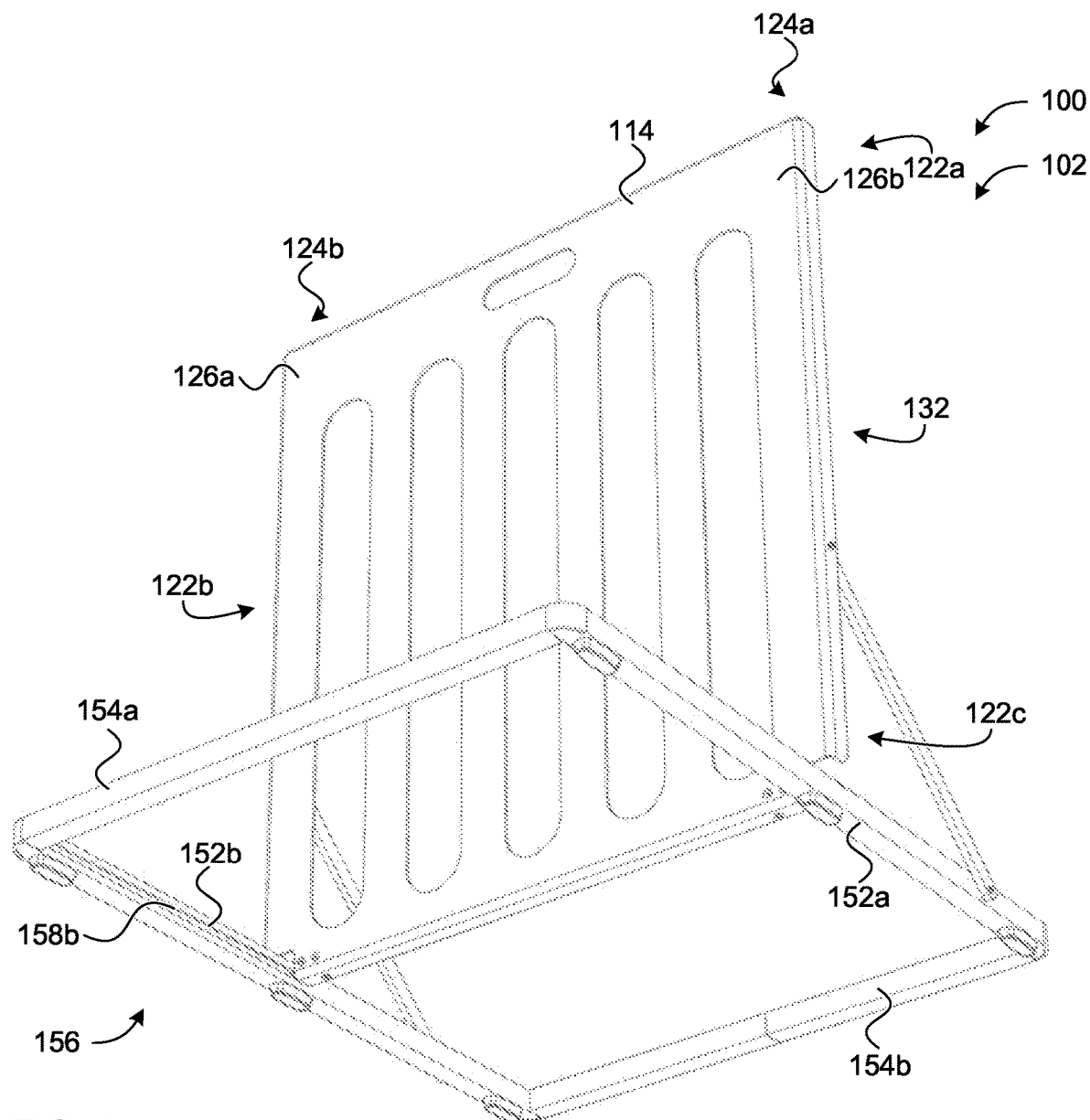
FIG. 4 is a bottom perspective view of the folding bicycle rack of FIGS. 1, 2, and 3.

FIG. 4 is a bottom perspective view of the folding bicycle rack 100 of FIGS. 1, 2, and 3 and a better view of example feet 156 disposed on a bottom surface of the base 112.

FIG. 5 is a perspective view of the folding bicycle rack 100 of FIGS. 1, 2, 3, and 4 in a stowed or transport position 502. In the stowed position 502, the first and second lower corners 128a, 128b of the support panel 114 are disposed near the first position 182a. The lower corners 128a, 128b slid in response to the pins sliding in the channels 158a, 158b. Simultaneously, the braces 116 transitioned from a deployed position to a retracted position (not shown). In the present example, the braces 116 in the retracted position are parallel with the support panel 114 and the first and second legs 152a, 152b. Additionally, when transitioning from the upright position 102 to the stowed position 502, the first and second upper corners 124a, 124b are brought near or adjacent to the second cross brace member 154b. As a result, and as shown in FIG. 5, the support panel 114 is parallel with the base 112 (e.g., parallel with the first and second legs 152a, 152b). In other examples, the support panel 114 is nearly parallel with the base 112 (e.g., angled 5 degrees (°), 10°, 20° relative to the base) such that the folding bicycle rack 100 is convenient to handle or store.

Figure 6A:
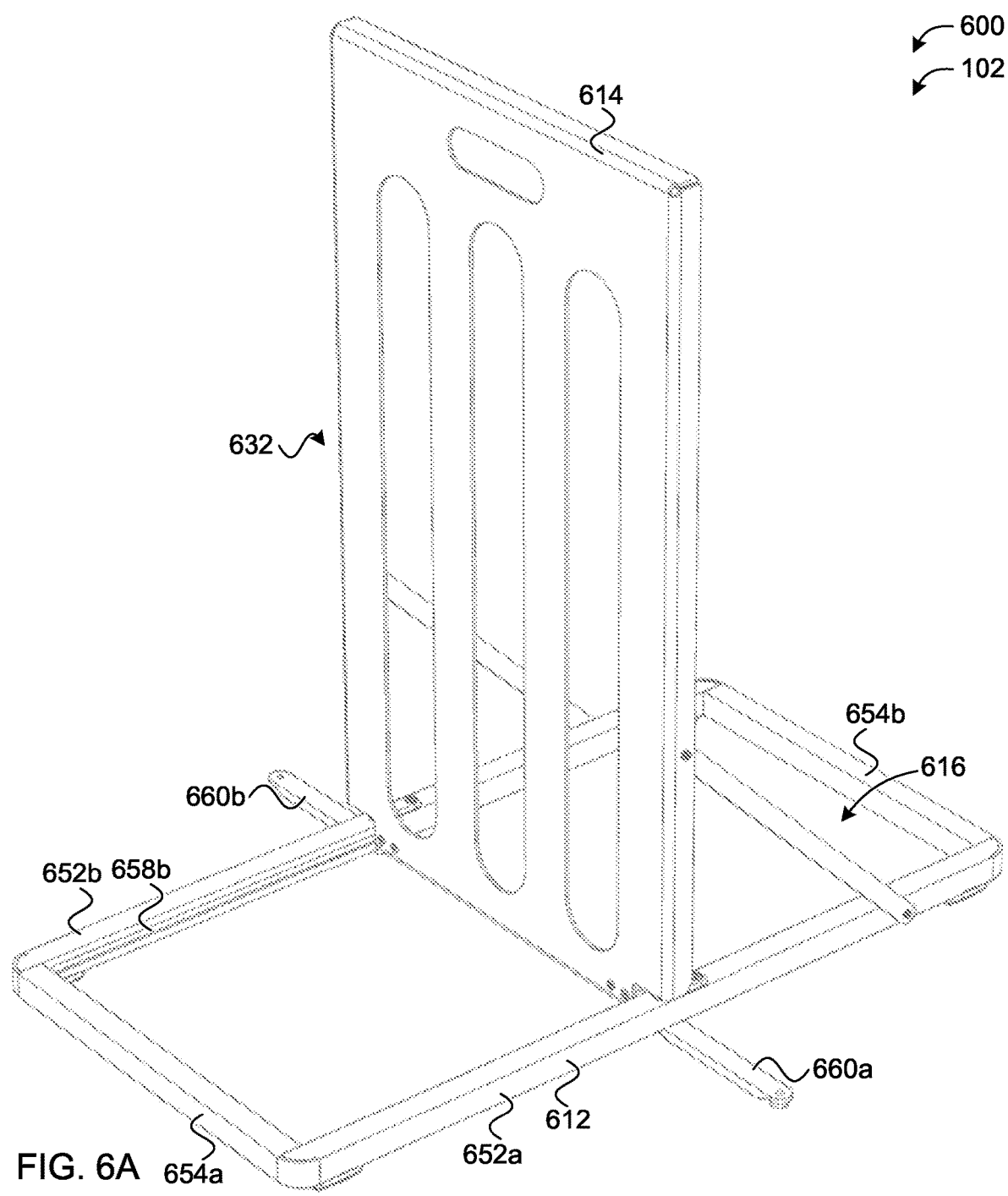
FIG. 6A is a perspective front view of an alternative folding bicycle rack in an upright or deployed position.
Figure 6B:
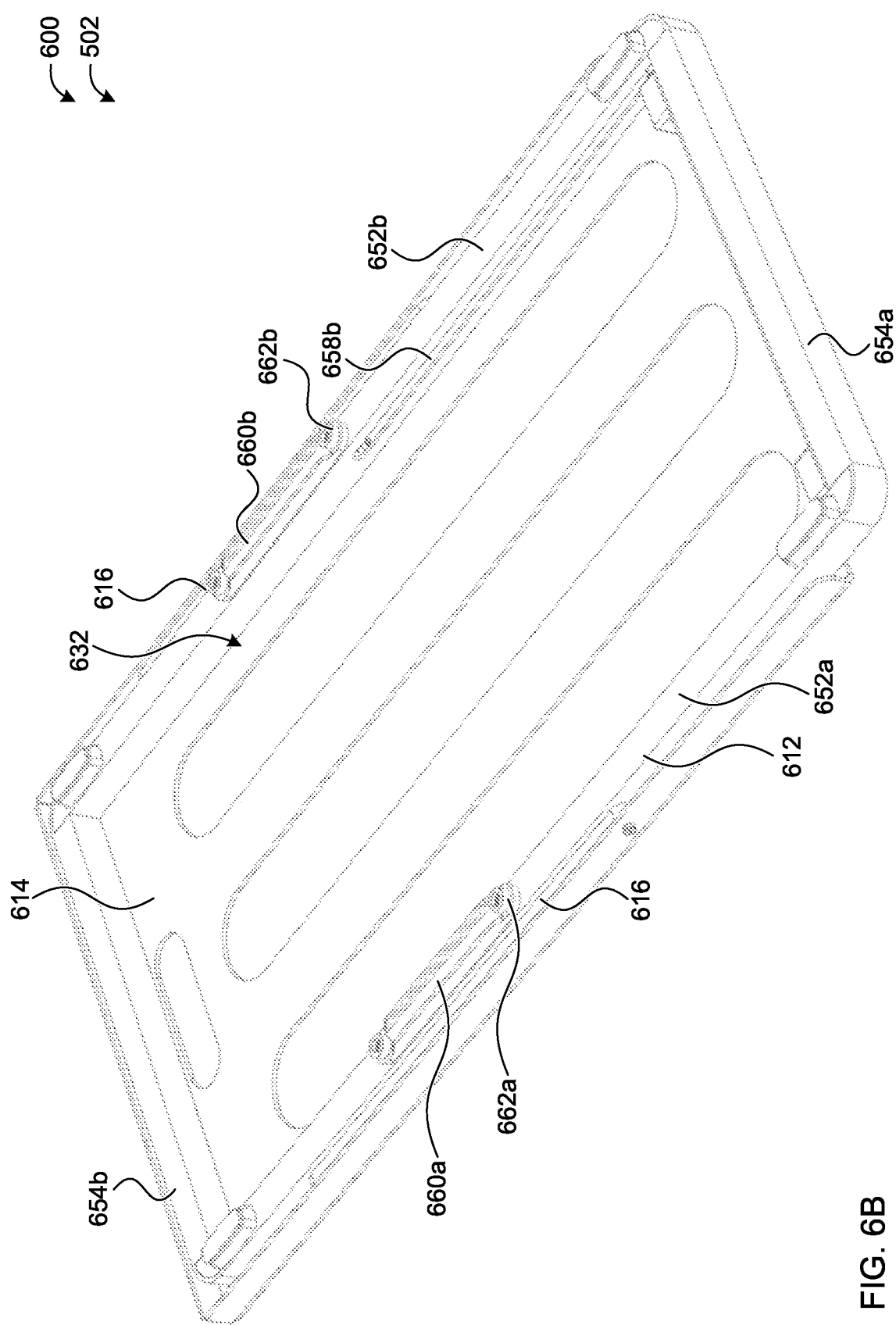
FIG. 6B is a perspective bottom view of the alternative folding bicycle rack of FIG. 6A in a stowed or transport position.

FIGS. 6A and 6B illustrate an alternative folding bicycle rack 600. FIG. 6A is a perspective front view of an alternative folding bicycle rack 600 in the upright position 102. The folding bicycle rack 600 is substantially similar to the folding bicycle rack 100. For example, the folding bicycle rack 600 includes a base 612, support panel 614, and braces 616. The base includes first and second legs 652a, 652b, having first and second channels (second channel 658b shown), and first and second cross braces 654a, 654b. The support panel 614 is slidably coupled with the base 612 in the same manner the support panel 114 is slidably coupled to the base 112. Thus, the folding bicycle rack 600 operates in an identical manner to the folding bicycle rack 100. For example, in the upright position 102 the support panel 114 is approximately perpendicular to the base 612 and the braces 616 are in the deployed position (shown in FIG. 6A). Additionally, in the stowed position 502, the support panel 114 is approximately parallel to the base 612 and the braces 616 are in the retracted position (shown in FIG. 6B).

The folding bicycle rack 600 differs from the folding bicycle rack 100 in that the support panel 614 includes three slots 632 while the support panel 114 includes five slots. As a result, the support panel 614 can secure three bicycles (two bicycles on one side in the outer slots and one bicycle on the other side in the inner slot).

The alternative folding bicycle rack 600 further includes a first leg extension 660a and a second leg extension 660b. The first and second leg extensions 660a, 660b are configured to increase the stability of the folding bicycle rack 600 in the upright position. The first and second leg extensions 660a, 660b increase the stability of the folding bicycle rack by increasing the area of the base 612. As shown in FIG. 6B, the first and second leg extensions 660a, 660b are pivotably coupled to the base 612 via pivotable couplings 662a, 662b. As a result, the first and second leg extensions 660a, 660b are actuatable between a stowed position (shown in FIG. 6B) and a deployed position (shown in FIG. 6A). In the deployed position, the first leg extension 660a is coupled to the first leg 652a and extends away from the second leg 652b and the second leg extension 660b is pivotally coupled to the second leg 652b and extends away from the first leg 652a. In other examples, the first and second leg extensions 660a, 660b may be permanently deployed, or may be coupled to the base in a different manner (e.g., shiftably, removably coupled, etc.).

Figure 7A:
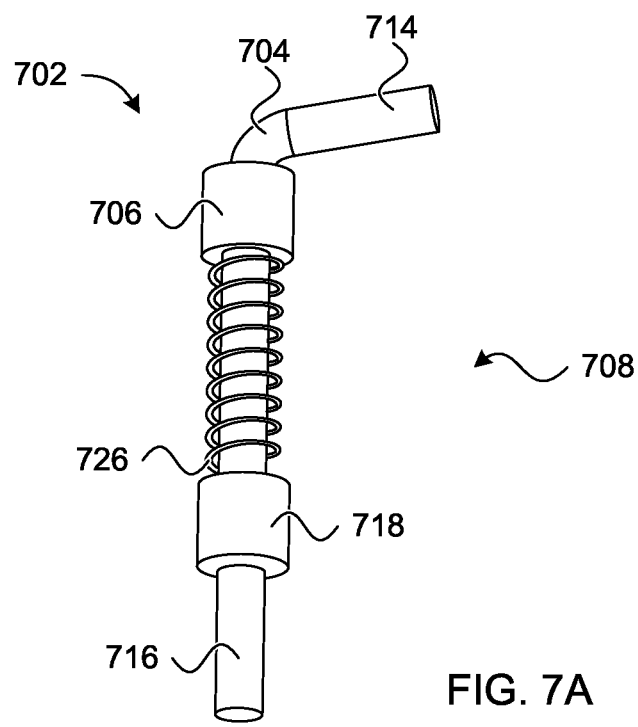
FIG. 7A illustrates an example retention assembly for use in the folding bicycle rack in accordance with the present disclosure.
Figure 7B:
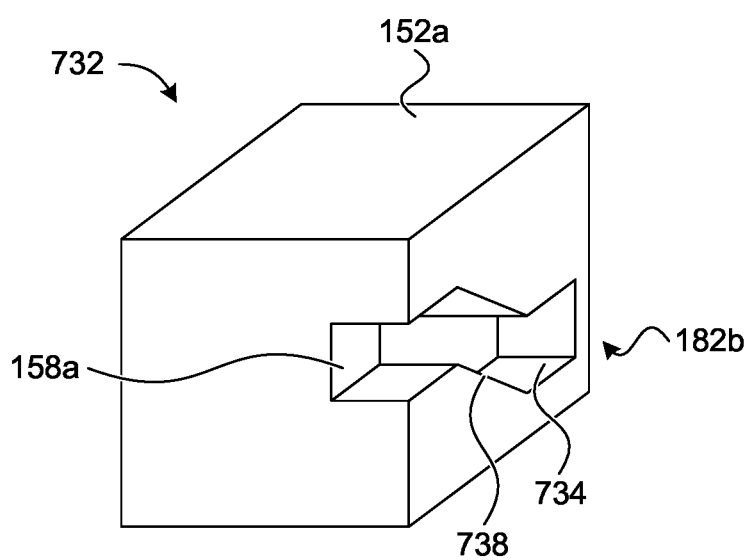
FIG. 7B illustrates an additional example retention assembly for use in the folding bicycle rack.

FIGS. 7A and 7B illustrate example retention assemblies for use in the folding bicycle rack 100, 600. In various examples, the retention assembly is disposed on the folding bicycle rack 100, 600 to selectively inhibit the folding bicycle rack 100, 600 to transition between the upright or deployed position 102 to the stowed or transport position 502. In various examples, the retention assembly can be configured to selectively inhibit movement of the pin disposed in the channel or the retention assembly can be configured to selectively inhibit movement of the brace.

FIG. 7A illustrates a mechanical latch, such as an example spring latch mechanism 702 that could be implemented as a retention assembly in accordance with the present disclosure. The spring latch mechanism 702 includes a latch 704 passing through a static shoulder 706 and a biasing mechanism 708. In some examples, the static shoulder 706 is a component of the folding bicycle rack (e.g., the first leg 152a) or is secured to a component of the folding bicycle rack assembly via adhesive, welding, or similar coupling.

The latch 704 includes an actuation arm 714, a pin 716 disposed opposite the actuation arm 714, and a shoulder 718 disposed proximate the pin 716. In the present example, the latch 704 comprises one integral structure, but in other examples, the actuation arm 714, the pin 716, and the shoulder 718 are separate components and coupled together. The biasing mechanism 708 is configured to bias the shoulder 718 away from the static shoulder 706. In the present example, the biasing mechanism 708 includes a spring 726 disposed between the static shoulder 706 and the shoulder 718.

When the actuating arm 714 is moved away from the static shoulder 706, the pin 716 and the shoulder 718 are pulled towards the static shoulder 706 and the spring 726 is compressed. With the pin 716 lifted, the latch mechanism 702 is in an open configuration. Subsequently, the actuating arm 714 can be released and the compressed spring 726 causes the shoulder 718 and the pin 716 to be actuated away from the static shoulder 706. Thus, the latch mechanism 702 is biased towards a closed configuration as shown in FIG. 7A. In one example, the spring latch mechanism 702 is installed on the folding bicycle rack 100, 600 and the pin 716 is disposed in the channel 158a, 158b. The pin 716 may completely block or partially block the channel 158a, 158b when the pin 716 is in the closed position. In the open position, the pin 716 is retracted and the channel 158a, 158b is sufficiently open to permit the sliding pin (e.g., pin 302a) to pass between the first position 182a and the second position 182b. Alternatively, the pin 716 may be configured to prevent pivotable rotation of the braces 116 when in the closed configuration and permit the braces 116 to pivot when the pin 716 is in the open configuration.

Although the mechanical latch of FIG. 7A is shown as a spring-loaded pin. In other examples, the mechanical latch could be a spring-loaded ball bearing, a clasping or clamping mechanism, or any actuatable mechanical structure that could selectively inhibit movement of a pin (e.g., pin 302a) or a brace (e.g., braces 116).

FIG. 7B illustrates an alternative retention assembly including a gravity retention mechanism 732. FIG. 7B illustrates a portion of the first leg 152a and a portion of the first channel 158a including the second position 182b.

In FIG. 7B, the gravity retention mechanism 732 includes a depressed trough 734. The depressed trough 734 is coupled to the first channel 158a via a retainer 738. In the present example, the retainer 738 is an angled wedge. As a result, the sliding pin (e.g., pin 302a) is biased to remain in the depressed trough 734 unless the support panel 114, 614 is lifted up out of the depressed trough 734. In other examples, the retainer 738 is a vertical ledge or friction the prevents or inhibits the pin from sliding from the second position 182b towards the first position 182a (shown, for example, in FIG. 1).

Figure 8:
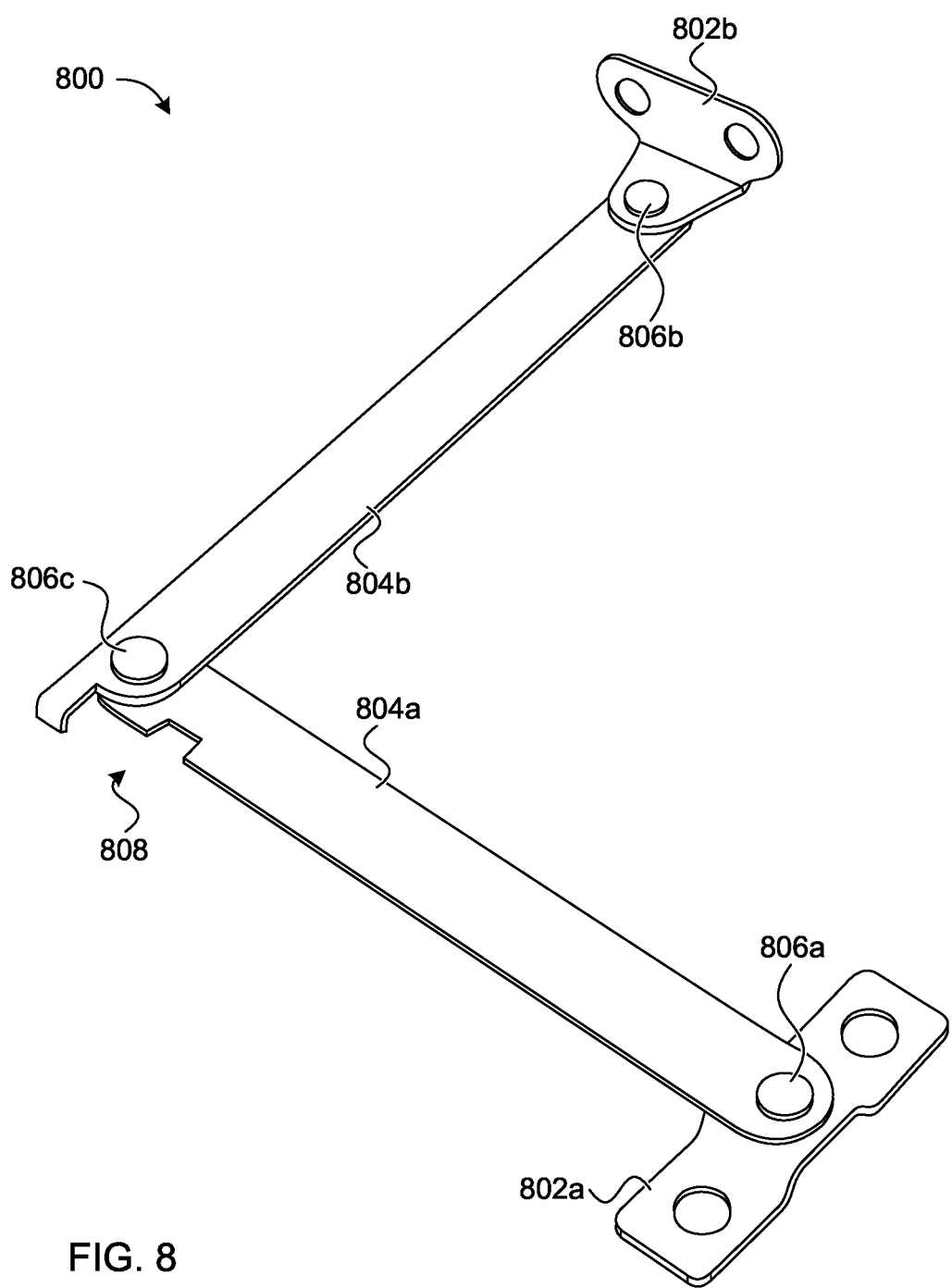
FIG. 8 illustrates an alternative brace for use in the folding bicycle rack in accordance with the present disclosure.

FIG. 8 illustrates a folding brace 800 as an alternative to the braces 116 of the folding bicycle rack 100, 600 of FIGS. 1-6. In some examples, the folding brace 800 can be coupled with the support panel (e.g., support panel 114) operating in a sliding manner (as discussed above in connection with FIGS. 1-6). In other examples, the folding brace 800, support panel, and base are coupled together such that the support panel folds relative to the base.

The folding brace 800 includes a first fastener 802a configured to couple the folding brace to the base (e.g., base 112). The first fastener 802a is coupled to a first arm 804a via pivotable coupling 806a. Additionally, the folding brace includes a second fastener 802b configured to couple the folding brace to the support panel (e.g., support panel 114). The second fastener 802b is pivotably coupled to a second arm 804b via pivotable coupling 806b. The first arm 804a and the second arm 804b are pivotally coupled via the pivotable coupling 806c. In the present example, the pivotable coupling 806c includes a locking arrangement to prevent the first arm 804a and the second arm 804b from pivoting too far.

Figure 9:
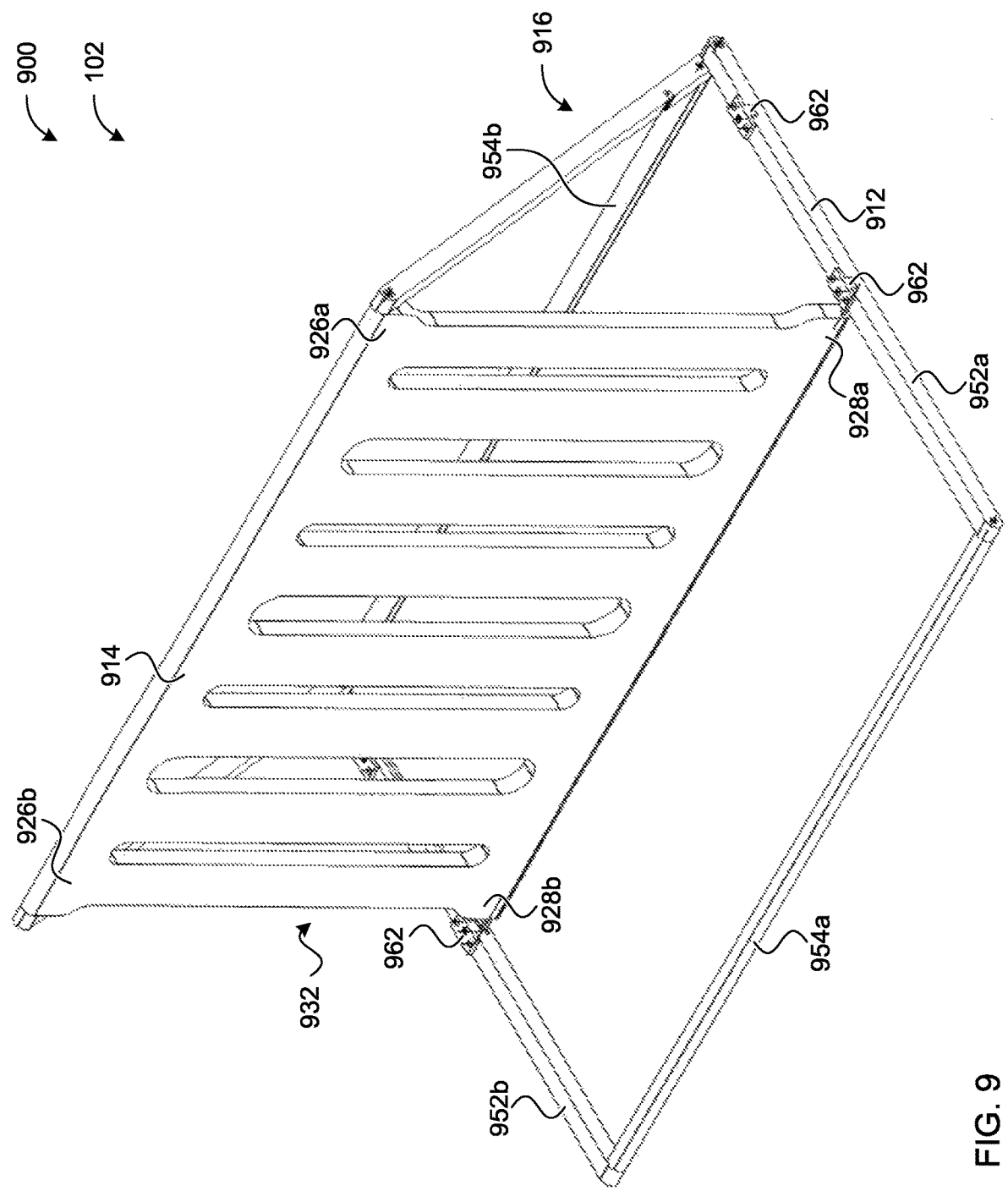
FIG. 9 is a front perspective view of another alternative folding bicycle rack in an upright or deployed position.
Figure 10:
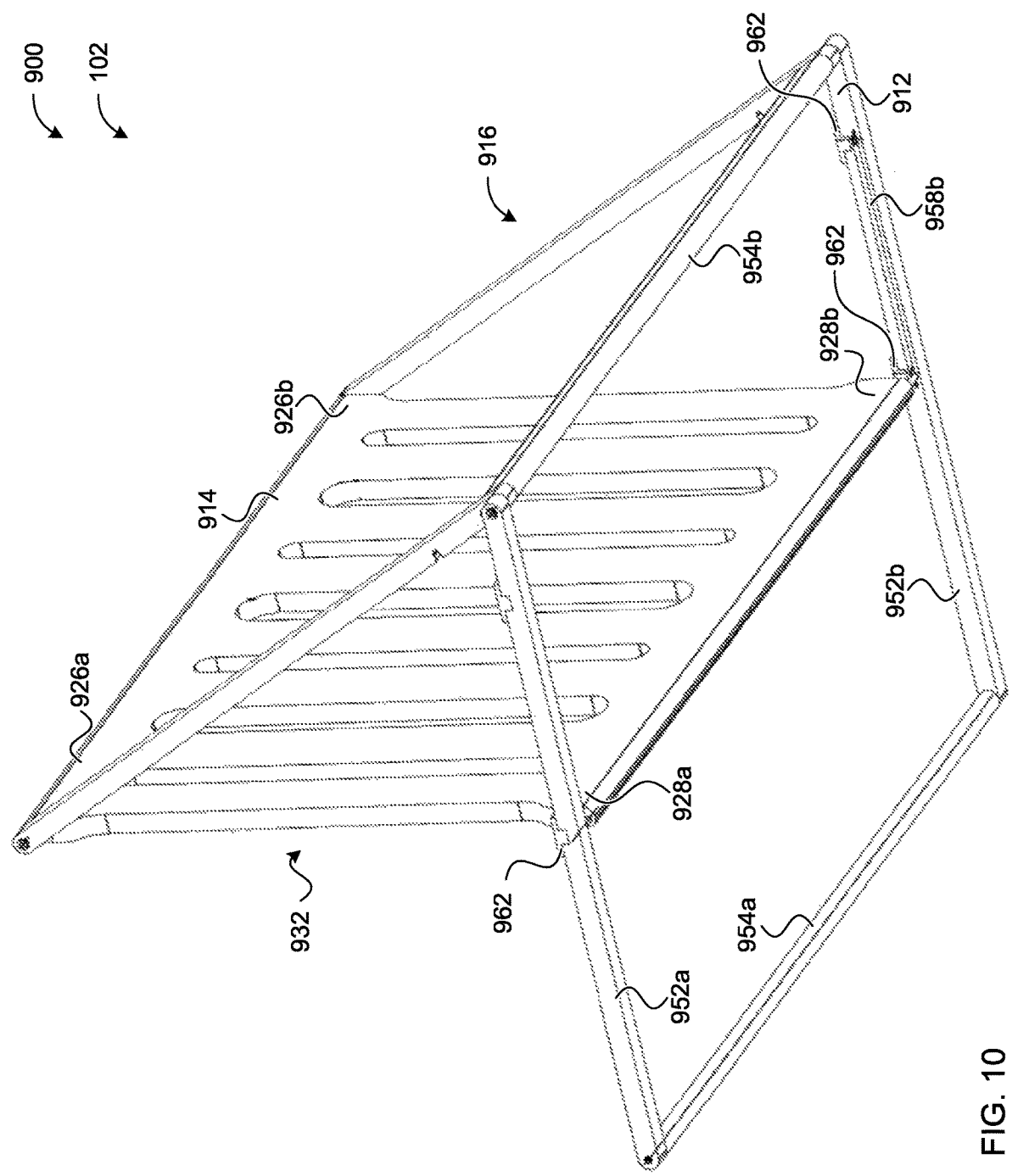
FIG. 10 is a bottom perspective view of the folding bicycle rack of FIG. 7.
Figure 11:
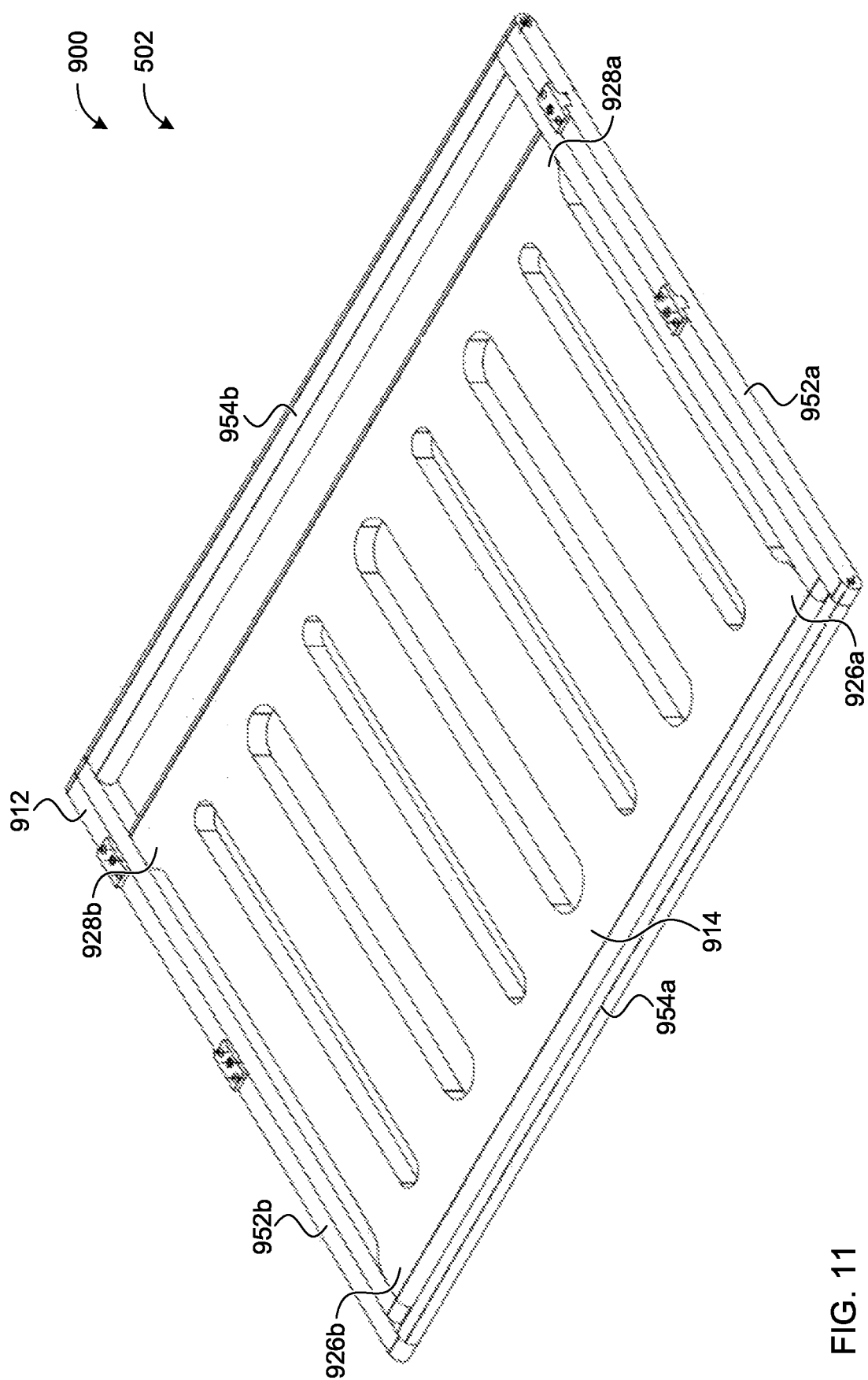
FIG. 11 is a perspective view of the folding bicycle rack of FIGS. 7 and 8 in a stowed or transport position.

FIGS. 9, 10, and 11 illustrate another alternative folding bicycle rack 900 in an upright position 102 and a stowed position 502. Similar to the folding bicycle rack 100 of FIGS. 1-5, the folding bicycle rack 900 includes a base 912, a support panel 914, and braces 916. Similar to the support panel 114, the support panel 914 is slidably coupled to the base 912 and the braces 916 are pivotally coupled to the support panel 914 and the base 912.

The support panel 914 includes first and second upper corners 926a, 926b and first and second lower corners 928a, 928b. The first and second upper corners 926a, 926b and first and second lower corners 928a, 928b are disposed on the support panel 914 in upper and lower portions of the support panel and first and second sides of the support panel, similar to the support panel 114. The support panel 914 further comprises a plurality of slots 932. In the example shown in FIG. 9, some slots are wider than other slots. In various examples, the slots may be configured for different bicycle tires (e.g., road tires, off-road tires, etc.).

The base 912 includes first and second legs 952a, 952b; first and second cross members 954a, 954b; and first and second channels 958a (not shown), 958b (shown in FIG. 10). The first leg 952a is spaced apart from, and disposed opposite, the second leg 952b. The base 912 further includes retention assemblies 962. In some examples, the retention assemblies 962 include magnets capable of inhibiting movement of a pin connected to the first and second lower corners 928a, 928b. For example, the pin (e.g., pin 302) may be metal and retained by the magnetic field of the magnets in the retention assemblies 962. Alternatively, the magnet of the retention mechanism 962 may move to block movement of a pin in a channel or impede the pivoting of the braces 916. As a result, the folding bicycle rack 900 can partially or selectively resist transitioning from an upright position 102 (shown in FIG. 9) and a transport or stowed position (shown in FIG. 11).

FIG. 11 illustrates the folding bicycle rack 900 in a stowed position 502. As shown in FIG. 11, the support panel 914 and the base 912 are coplanar. But, in some examples, the support panel 914 and the base 912 may be parallel or near parallel relative to each other.

Figure 12:
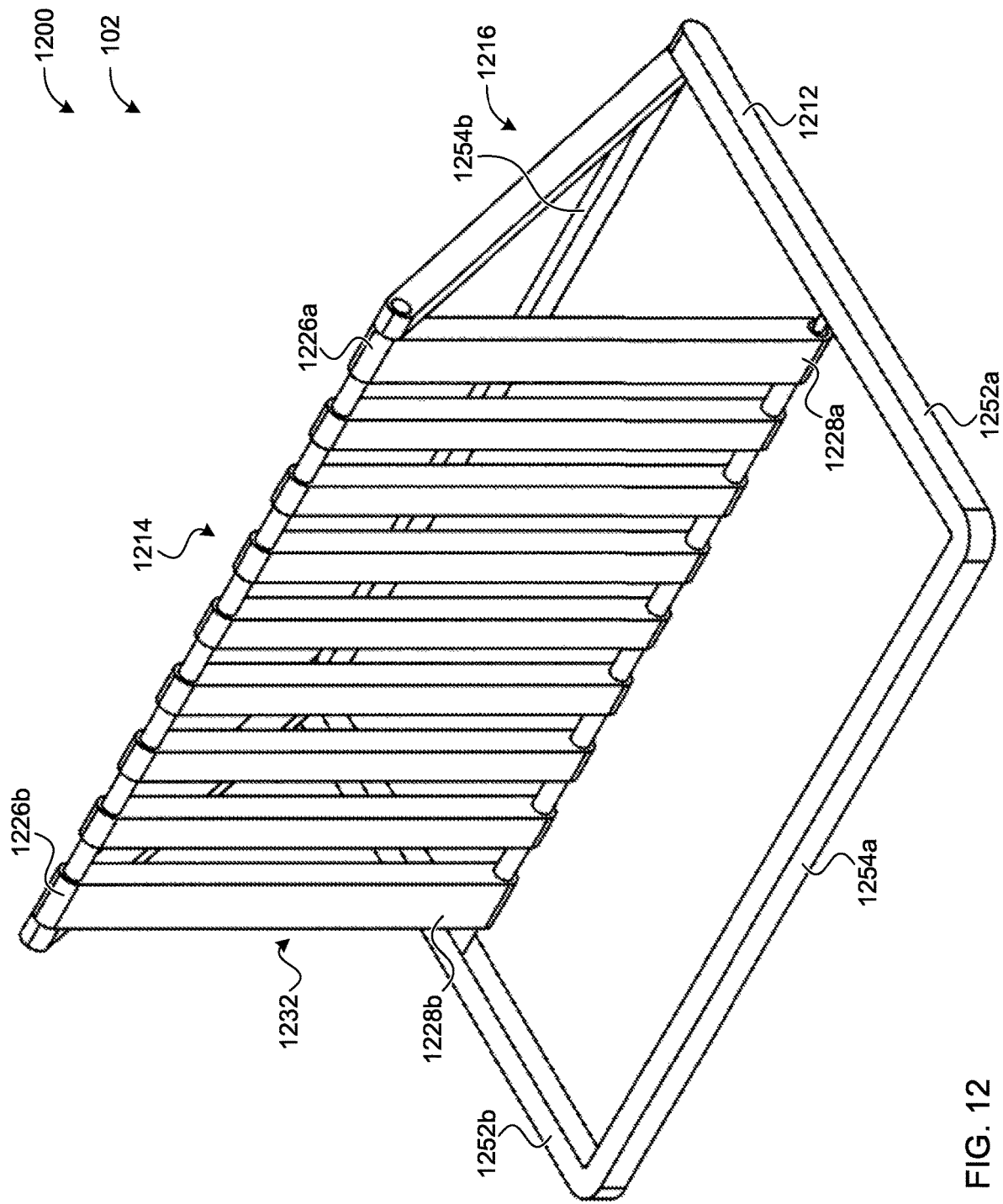
FIG. 12 is a front perspective view of an alternative folding bicycle rack in an upright or deployed position.
Figure 13:
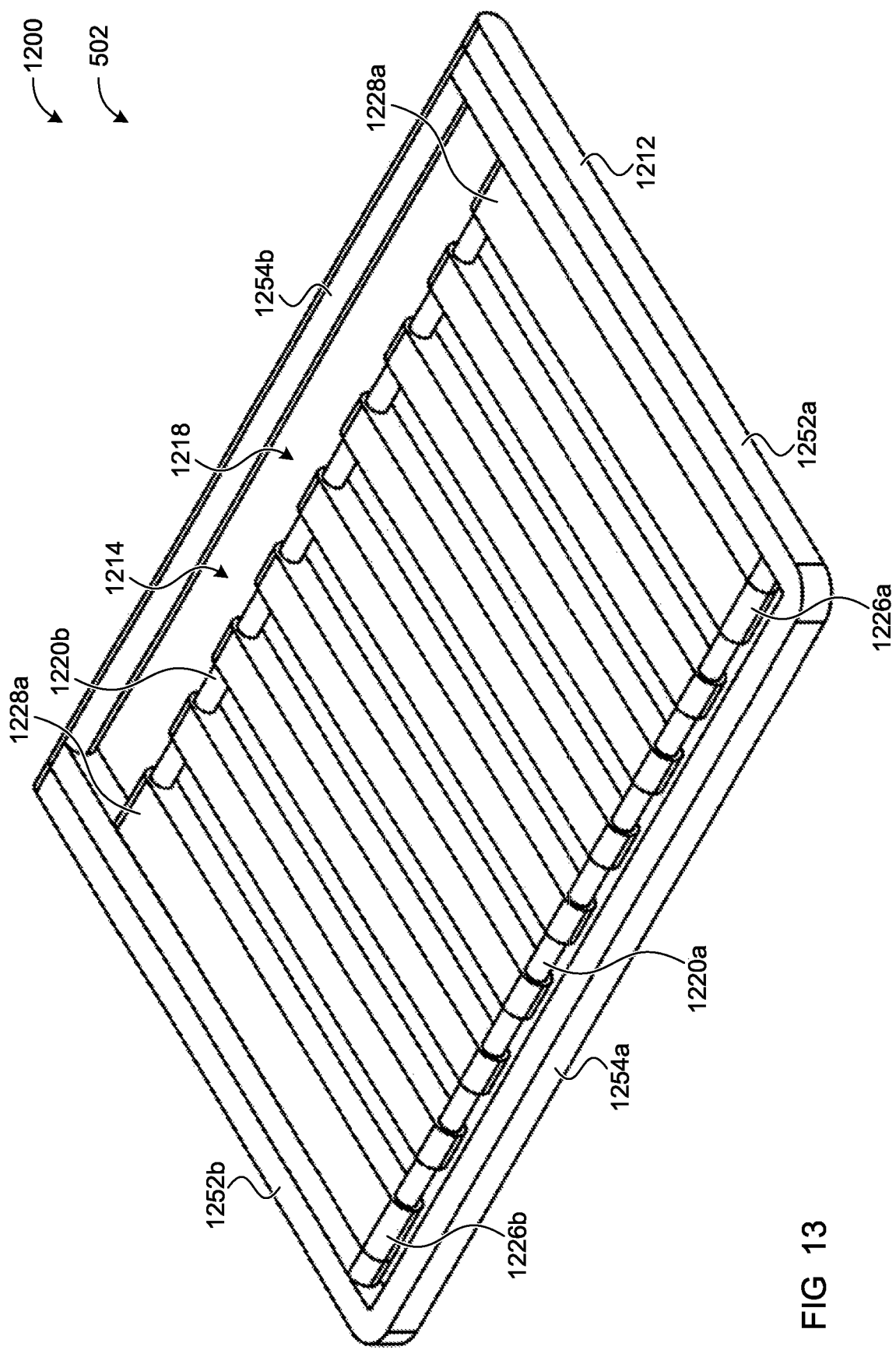
FIG. 13 is a perspective view of the folding bicycle rack of FIG. 10 in a stowed or transport position.

FIGS. 12 and 13 illustrate an alternative folding bicycle rack 1200 of the folding bicycle rack 900 in an upright position 102 and a packed position 1602. In contrast to the folding bicycle rack 900, the support panel 1214 is not a unitary structure, but made a plurality of struts 1218 connected to top and bottom arms 1220*a*, 1220*b*.

Figure 14:
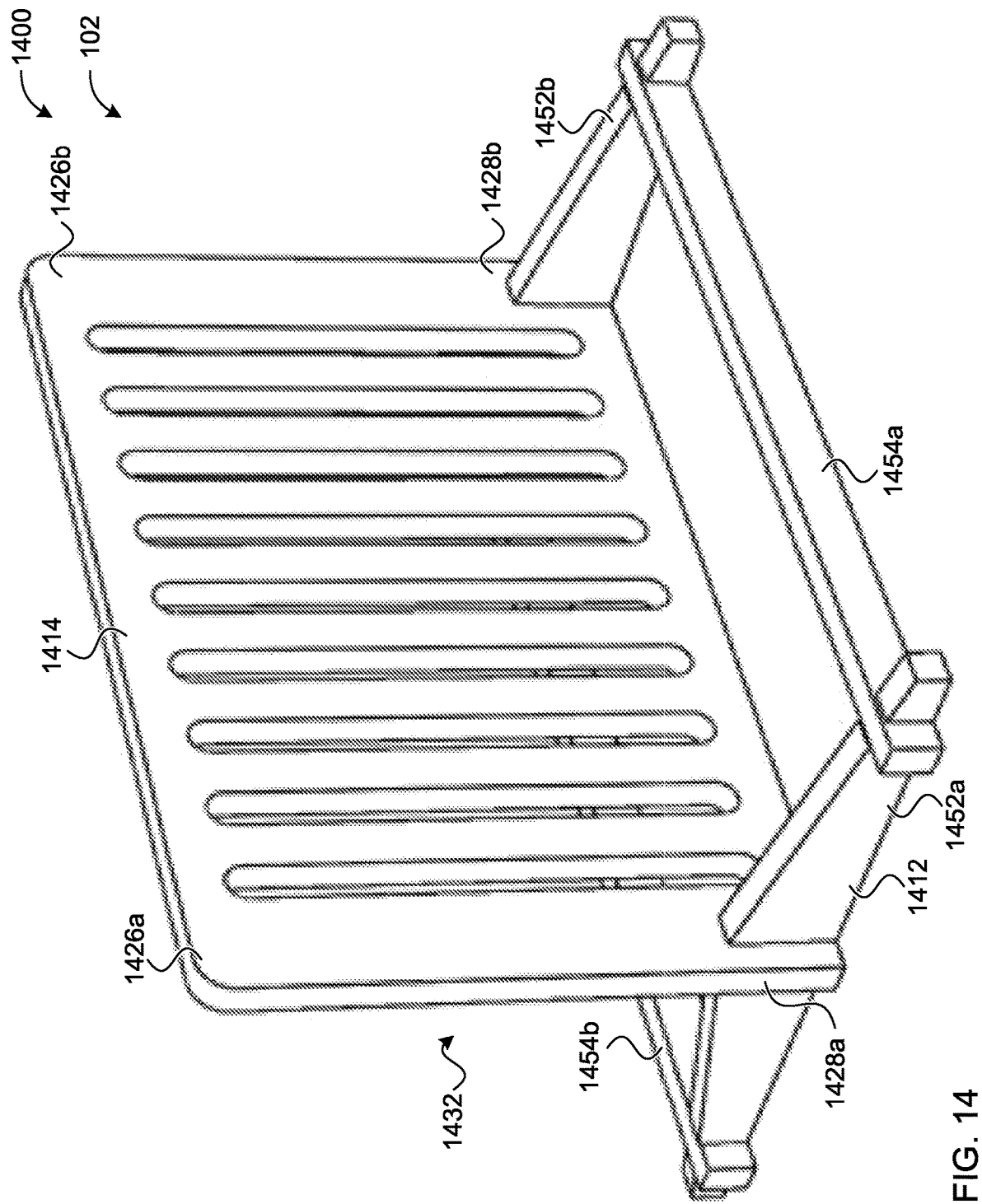
FIG. 14 is a perspective view of a folding bicycle rack in an upright or deployed position.
Figure 15:
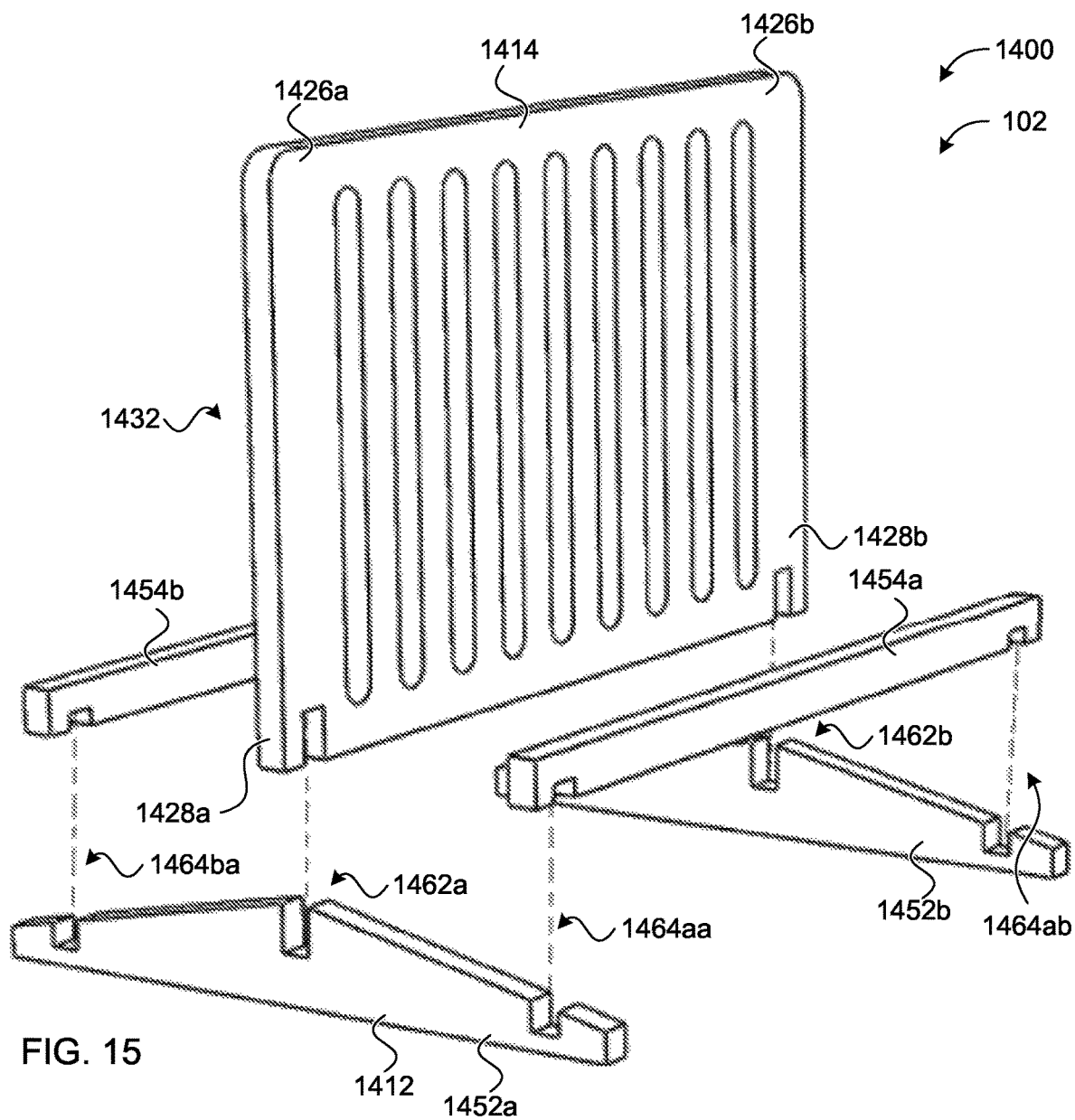
FIG. 15 is an exploded view of the folding bicycle rack of FIG. 12.
Figure 16:
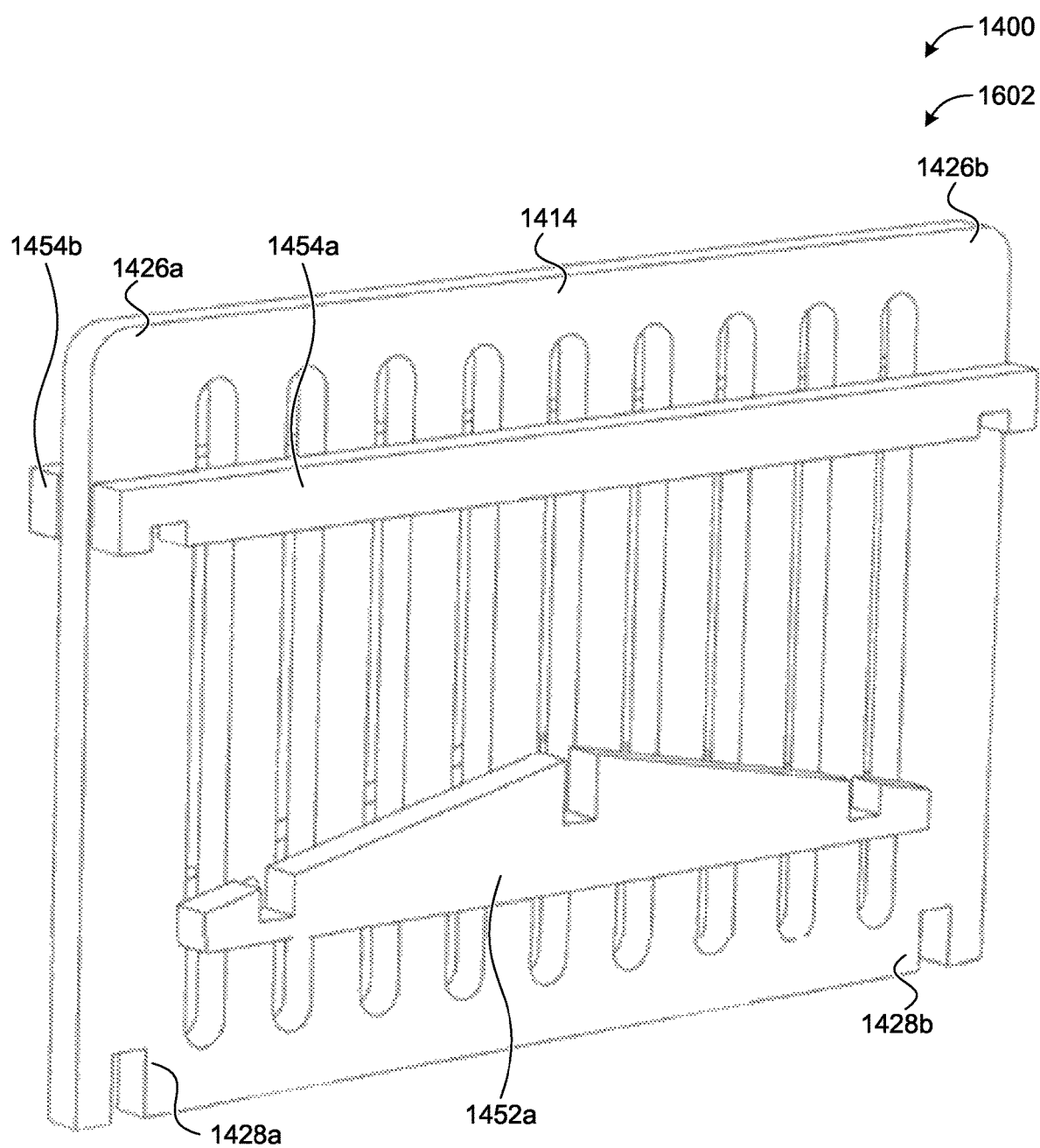
FIG. 16 is a perspective view of the folding bicycle rack of FIGS. 12 and 13 in a storage or transport configuration.

FIGS. 14, 15, and 16 illustrate another bicycle rack made in accordance with the present disclosure. The bicycle rack 1400 differs from the folding bicycle racks 100, 600, 900, 1200 because the bicycle rack 1400 doesn't fold but is assembled and disassembled, as shown in FIG. 15. Otherwise, the bicycle rack 1400 includes a base 1412 and a support panel 1414 like the folding bicycle racks 100, 600, 900, 1200.

FIG. 15 illustrates how the bicycle rack 1400 is assembled and disassembled. The support panel 1414 is coupled to a first and second leg 1452*a*, 1452*b* via half lap joints 1462*a*, 1462*b*. Similarly, a first cross member 1454*a* is coupled to the first and second legs 1452*a*, 1452*b* via half lap joints 1464*aa*, 1464*ab* and a second cross member 1454*b* is coupled to the first and second legs 1452*a*, 1452*b* via half lap joints 1464*ba*, 1464*bb* (not shown). In some examples, some or all of the half lap joints 1462*a*, 1462*b*, 1464*aa*, 1464*ab*, 1464*ba*, 1464*bb* include a magnet or other securement mechanism to selectively secure the joints together.

FIG. 16 illustrates the bicycle rack 1400 in a storage position 1602. In the storage position 1602, the first and second legs 1452*a*, 1452*b* and the first and second cross braces 1454*a*, 1454*b* are removably secured to the support panel 1414. In some examples, magnets are disposed on each of the support panel 1414, first and second legs 1452*a*, 1452*b*, and first and second cross member 1454*a*, 1454*b*. Alternatively, any releasable mechanical latch could be used to secure the first and second legs 1452*a*, 1452*b* and the first and second cross braces 1454*a*, 1454*b* to the support panel 1414 in the storage position 1602.

Those skilled in the art will recognize that a wide variety of modifications, alterations, and combinations can be made with respect to the above described examples without departing from the spirit and scope of the invention(s) disclosed herein, and that such modifications, alterations, and combinations are to be viewed as being within the ambit of the inventive concept(s).

What is claimed is:

1. A folding bicycle rack, comprising:
   a base having a first leg and a second leg spaced apart from the first leg, each of the first and second legs having a longitudinal channel;
   a support panel having an upper portion, a lower portion, and a central portion extending between the upper portion and the lower portion, the support panel including a plurality of slots sized and positioned to receive a portion of a bicycle wheel, the support panel arranged to shift between a stowed position and an upright position;
   the support panel including first and second lower portions, the first lower portion slidably coupled to the longitudinal channel of the first leg and the second lower portion slidably coupled to the longitudinal channel of the second leg, the first and second lower portions arranged to pivot relative to the base and slide between first and second positions relative to the longitudinal channels as the support panel shifts between the stowed and upright positions, the first and second positions spaced apart from one another;
   the support panel including a first side and a second side;
   a pair of braces, each coupled by a fixed pivot to the base and coupled to a corresponding one of the sides of the support panel;
   wherein when the support panel is in the stowed position the first and second lower portions of the support panel are disposed at the first position, and when the support panel is shifted to the upright position the first and second lower portions are disposed at the second position, the first and second positions spaced apart from one another; and
   a retention assembly carried by the first and second lower portions and arranged to engage a portion of the first and second legs to thereby secure the first and second lower portions in the second position thereby securing the support panel in the upright position;
   wherein the retention assembly comprises a biased mechanical latch disposed within one of the longitudinal channels and having an engaged position in which the biased mechanical latch inhibits the first and second lower portions of the support panel from moving along the longitudinal channels.

2. The folding bicycle rack of claim 1, wherein the retention assembly further comprises a disengaged position in which the biased mechanical latch permits the first and second lower portions of the support panel to move along the longitudinal channels, and wherein the biased mechanical latch is biased toward the engaged position.

3. The folding bicycle rack of claim 1, wherein the pair of braces are coupled to the base at a location spaced away from the end of the first leg and the second leg.

4. The folding bicycle rack of claim 1, wherein the first lower portion is shiftably coupled to the first leg via a first pin and the second lower portion is shiftably coupled to the second leg via a second pin; and
   the retention assembly includes a magnet disposed on the base configured to releasably retain at least one of the first pin and the second pin in engagement with the first leg or the second leg, respectively, when the support panel is in the stowed position.

5. The folding bicycle rack of claim 4, wherein at least one of the first pin and the second pin includes a bushing.

6. The folding bicycle rack of claim 4, wherein the first pin is shiftably disposed in the longitudinal channel of the first leg and the second pin is shiftably disposed in the longitudinal channel of the second leg.

7. The folding bicycle rack of claim 6, wherein the retention assembly comprises a first depressed trough in the longitudinal channel of the first leg and a second depressed trough in the longitudinal channel of the second leg, wherein the first pin and the second pin are releasably secured in the first and second depressed troughs when the support panel is in the upright position.

8. A folding bicycle rack, comprising:
   a base having a first leg and a second leg spaced apart from the first leg, each of the first leg and the second leg including a longitudinal channel;
   a support panel having an upper portion, a lower portion, and a central portion extending between the upper portion and the lower portion, the support panel including a plurality of slots sized and positioned to receive a portion of a bicycle wheel;

the support panel including first and second lower portions, each of the first and second lower-portions arranged to pivot and slide relative to the base along a corresponding one of the longitudinal channels of the first leg and the second leg, respectively; and a brace coupled to the support panel by a first fixed pivot and coupled to the base by a second fixed pivot;

a first folding extension coupled to the first leg and configured to extend away from the first leg;

wherein the first folding extension is shiftable between a first position in which the first folding extension is disposed parallel to the first leg, and a second position in which the first folding extension extends away from the base;

wherein the support panel of the folding bicycle rack is shiftable between a stowed position in which the first and second lower portions of the support panel are disposed in a first position within the longitudinal channels of the first and second legs, and an upright position in which the first and second lower portions of the support panel are disposed in a second position within the longitudinal channels of the first and second legs, the first and second positions being spaced apart relative to the longitudinal channels; and a retention assembly for securing the first and second lower portions of the support panel in the second position thereby securing the support panel in the upright position.

9. The folding bicycle rack of claim 8, further comprising a second extension coupled to the second leg and configured to extend away from the first leg.

10. The folding bicycle rack of claim 8, wherein the support panel is a unitary piece, and wherein the base includes at least one cross member extending between the first leg and the second leg.

11. The folding bicycle rack of claim 8, and further including
another brace coupled to an opposite side of the support panel by a third fixed pivot and coupled to the base by a fourth fixed pivot.

12. The folding bicycle rack of claim 8, wherein the retention assembly comprises a mechanical latch having a releasable pin arranged to engage the first and second lower portions of the support panel when the support panel is in the upright position.

13. The folding bicycle rack of claim 8, wherein all of the support panel is parallel to the base when the support panel is in the stowed position.

14. The folding bicycle rack of claim 8, wherein in the second position the first folding extension is perpendicular to the first leg.

* * * * *